(12) United States Patent
Musser et al.

(10) Patent No.: US 7,614,048 B1
(45) Date of Patent: Nov. 3, 2009

(54) SYSTEM AND METHOD FOR AUTOMATED SOFTWARE DISTRIBUTION IN A FIBER OPTIC NETWORK

(75) Inventors: Max L. Musser, Stone Mountain, GA (US); Frederick Edwards, EllenWood, GA (US); Robert J. Bates, Alpharetta, GA (US); Christopher Drew, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 683 days.

(21) Appl. No.: 09/966,040

(22) Filed: Sep. 28, 2001

(51) Int. Cl.
G06F 9/44 (2006.01)

(52) U.S. Cl. .................. 717/173; 717/169; 717/171; 717/172

(58) Field of Classification Search .............. 717/171
See application file for complete search history.

(56) References Cited

U.S. PATENT DOCUMENTS

| | | | | |
|---|---|---|---|---|
| 5,155,847 A * | 10/1992 | Kirouac et al. | ......... | 709/221 |
| 6,003,065 A * | 12/1999 | Yan et al. | ......... | 709/201 |
| 6,009,274 A * | 12/1999 | Fletcher et al. | ......... | 717/173 |
| 6,097,721 A * | 8/2000 | Goody | ......... | 370/379 |
| 6,167,567 A * | 12/2000 | Chiles et al. | ......... | 717/173 |
| 6,175,552 B1 * | 1/2001 | Parry et al. | ......... | 370/216 |
| 6,362,908 B1 * | 3/2002 | Kimbrough et al. | ......... | 398/164 |
| 6,466,572 B1 * | 10/2002 | Ethridge et al. | ......... | 370/352 |
| 6,640,334 B1 * | 10/2003 | Rasmussen | ......... | 717/171 |
| 6,678,741 B1 * | 1/2004 | Northcutt et al. | ......... | 709/248 |
| 6,751,794 B1 * | 6/2004 | McCaleb et al. | ......... | 717/168 |
| 6,775,433 B2 * | 8/2004 | BuAbbud | ......... | 385/24 |
| 7,035,504 B2 * | 4/2006 | BuAbbud | ......... | 385/24 |
| 2002/0073304 A1 * | 6/2002 | Marsh et al. | ......... | 713/1 |

OTHER PUBLICATIONS

Marconi Manual, "Disc S FiberStar Element Management System," Job Aids, 363-257-252, Issue 2, May 2000.*
Raj Reddy, http://www.rr.cs.cmu.edu/ndg/FTH-1997.html "Prospects for Fiber to the Home (FTTH)", 1997.*
Matti Rantanen, Fiber-to-the Home, Nov. 10, 1998 pgs. all.*
Van de Voorde et al., "The SuperPON Demonstrator: An Exploration of Possible Evolution Paths for Optical Access Networks", IEEE Communication Magazine, Feb. 2000, pp. 74-82.*
Reichmeyer et al., "An Optical Hypercube Local Area Network", Proceedings of the Twenty-Seventh Annual Hawaii International Convernece on System Sciences, IEEE, 1994, pp. 471-480.*

(Continued)

*Primary Examiner*—Lewis A Bullock, Jr.
*Assistant Examiner*—Jue S Wang

(57) ABSTRACT

A system for automated software distribution to network elements in a fiber-optic network is disclosed. The system contacts multiplexors, which communicate with a central office, and checks the status of software stored on a plurality of firmware cards located in the multiplexor. If the software on the plurality of the firmware cards is not the same across all cards, or is not the desired version, the system automatically downloads the desired software version to the appropriate cards. The system thereafter contacts network units connected to the multiplexor and checks the status of software stored on firmware cards located in the network units. If the software on the firmware cards is not the same across all cards, or is not the desired version, the system automatically downloads the desired software version to the appropriate cards.

13 Claims, 4 Drawing Sheets

OTHER PUBLICATIONS

Salloum et al., "Fiber in the Loop Systems Powering: Bellcore Requirements", IEEE 1992, pp. 117-123.*

Marconi Manual, "Disc☆S FiberStar Element Management System," Job Aids, 363-257-252, Issue 2, May 2000.

"Disc☆S FITL Ethernet Data Maintenance and Trouble Clearing," TIL-010, Marconi Proprietary Information, Issue A, undated Beta document (applicant is attempting to locate date release version).

* cited by examiner

SYSTEM AND METHOD FOR AUTOMATED SOFTWARE DISTRIBUTION IN A FIBER OPTIC NETWORK

FIELD OF THE INVENTION

The present invention relates generally to telecommunications systems, and more particularly, to systems and methods for automatically distributing software to network elements comprised in a fiber-optic telecommunication system.

BACKGROUND OF THE INVENTION

The demand for in-home data and telephony services has increased dramatically in recent years and the trend is expected to continue. Accordingly, providers of data and telephony services have sought to design and deploy networks with increased capacity for delivery of these services.

Of particular interest have been fiber-optic networks, which typically provide greater bandwidth than competing technologies. Indeed, there has been much consideration of bringing fiber-optic capacity from the core of the telecommunication network to the end user through a portion of telecommunication network often referred to as the "local loop." Fiber-to-the-curb (FTTC) and fiber-to-the-home (FTTH) networks, as the names suggest, provide fiber-optic cables directly, or nearly directly, to the home and thereby provide the increased bandwidth and flexibility of services associated with fiber optic technology.

Of course, there are numerous obstacles associated with deploying fiber optic technologies deep into the distribution network. Notably, there is a tremendous financial cost associated with deploying new fiber-optic networks. Furthermore, there are added complexities associated with managing and operating these new technologies. For example, the FTTC and FTTH fiber-optic systems currently marketed by some vendors such as for example, Marconi Communications Inc., require the incorporation of optical network units ("ONU's") in close proximity (i.e. several hundred to several thousand feet) to the end user. These ONU's are connected to corresponding multiplexors, which may be referred to as host digital terminals ("HDT's"). HDT's may be located, for example, in remote terminals (RT's) that are connected through routers located in central offices (CO's). Generally, the ONU's and HDT's comprise firmware cards therein. When the version of software running on the firmware cards located in the ONU's and HDT's is not the same version, it can lead to excessive background noise that negatively affects the operation of the network. In order for the network to operate efficiently, the software running on the firmware cards on each ONU should be compatible with, and preferably the same version as, the corresponding software on the HDT's. Furthermore, in order for the network to operate most efficiently, the firmware for all cards in all HDT's throughout the network should be the same.

Service providers gradually build out their FTTC and FTTH networks while equipment vendors frequently update the software to be used in their ONU's and HDT's. As a consequence, it often happens that the firmware cards in the ONU's are not running the same software version. Similarly, the software located in the firmware cards of the multiplexors are often not the same version. Furthermore, the software in the firmware cards of the ONU's may be incompatible with the software in the firmware cards of the multiplexors.

Existing systems have the capability to query a network element such as an ONU or HDT for the version of software running on a particular card on a particular machine. However, there are no systems or methods for automatically checking the software running on firmware cards of the ONU's and multiplexors throughout a network, identifying outdated software on these machines, and downloading the appropriate software version as needed. Rather, a technician must manually check each ONU card and each multiplexor card for the software thereon, and if the software is not that which is desired, manually update the software. Relying on a technician to update the software may be acceptable for networks where the build-out of multiplexors and NU's is slow and the total size of the network is small. However, for large networks and networks that are being quickly deployed, relying on manual maintenance of software is unacceptable. Indeed, relying on technicians introduces human error to the process and can be very expensive.

Accordingly, there is a need in the art for automated systems and methods for checking the status of software on network elements comprised in a fiber optic network, identifying outmoded software, and updating the software as necessary.

SUMMARY OF THE INVENTION

Briefly, the present invention meets these and other needs in the art.

Generally, the invention relates to systems and methods for automatically provisioning software to network elements comprised in a fiber optic communications network. A system in accordance with the invention is operable in a network comprising a plurality of fiber optic multiplexors, or HDT's, each of which communicates with a plurality of ONU's. Each ONU comprises a firmware card and each multiplexor comprises a plurality of firmware cards. A computing system, which is referred to as a software distribution system (SDS), is operable to automatically identify out-moded software on the firmware cards of multiplexors and ONU's and update the software as necessary. The SDS is operable to update all multiplexors in a network as well as all ONU's connected to each of the multiplexors. Thus, an SDS in accordance with the invention insures that the desired software versions are running on all network elements and thereby provides for the efficient operation of the network.

Additional aspects of the invention are described in detail below.

BRIEF DESCRIPTION OF THE DRAWINGS

Other features of the invention will be further apparent from the following detailed description of presently preferred exemplary embodiments of the invention taken in conjunction with the accompanying drawings, of which.

DETAILED DESCRIPTION OF THE INVENTION

A system and method with the above-mentioned beneficial features in accordance with a presently preferred exemplary embodiment of the invention will be described below with reference to FIGS. 1-4. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Generally, the invention relates to systems and methods for automatically checking the compatibility of software located on multiplexors and ONU's in an optical fiber network and updating the software as necessary. A system in accordance with the invention is operable in a network comprising a plurality of fiber optic multiplexors each of which communicates with a plurality of ONU's. A software distribution system in accordance with an aspect of the invention is operable to automatically check the software on a multiplexor, check the software on the ONU's communicating with the multiplexor, and update the software as necessary.

An exemplary embodiment of a system and method for checking the compatibility of software in an optical network and updating software as necessary is described below. Specifically, a system and method for managing software compatibility in a fiber in the loop (FITL) network such as that manufactured by Marconi Communications Corporation is described below. The systems and methods are presented for exemplary purposes only and are not meant to limit the scope of the invention. Accordingly, those skilled in the art recognize that the invention applies to other types of optical networks such as, for example, the Deep Fiber HFC and Deep Fiber FTH systems marketed by Marconi Communications Corporation. Indeed, the present invention applies to any type of optical network requiring software compatibility between ONU's and multiplexors incorporated in the network.

Figure 1:
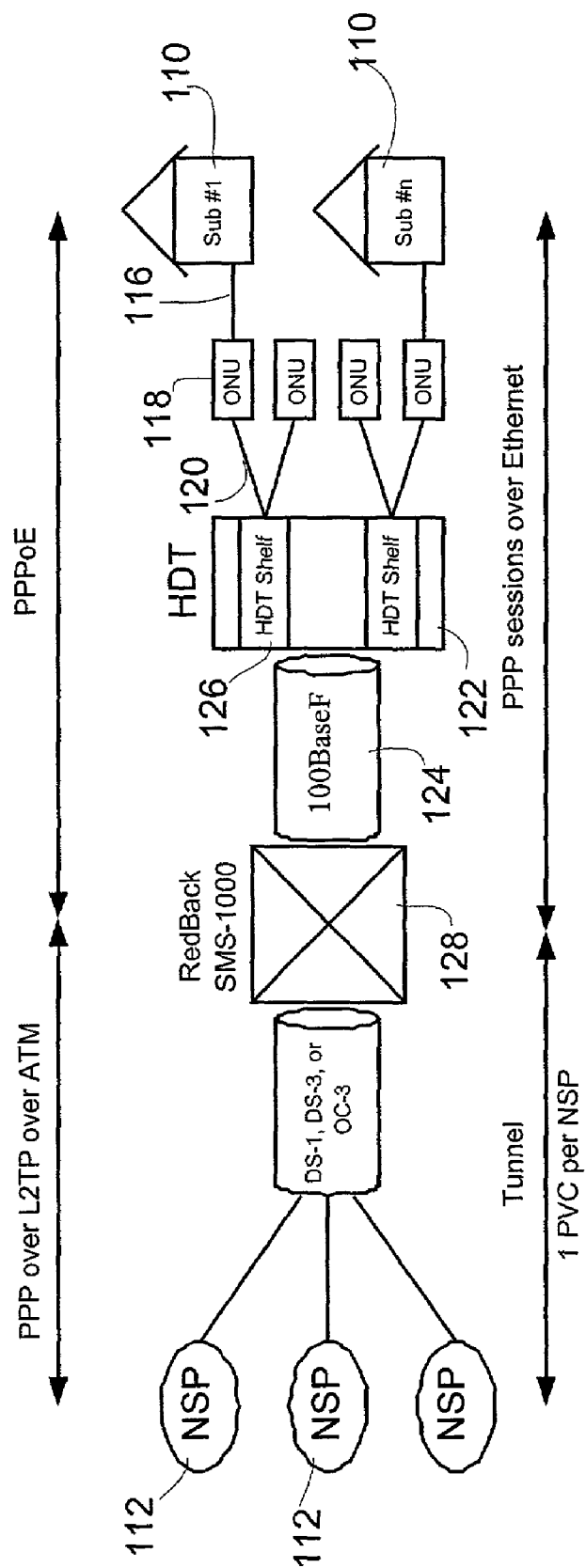
FIG. 1 is a high level diagram of an optical fiber network.

FIG. 1 is a high level diagram of an exemplary communication network 100 in which a system in accordance with the present invention is operable. Specifically, exemplary network 100 comprises a fiber in the loop (FITL) network such as is marketed by Marconi Communications Corporation. Network 100 provides high-speed data access between subscriber locations 110 and NSP's or ISP's 112. A 10BaseT Ethernet connection 116 is provided between subscribers 110 and Optical Network Units ("ONU's) 118. ONU's 118 operate as a local concentrator of subscriber connections and are typically located in close proximity (e.g. several hundred to several thousand feet) to end user locations 110. ONU's 118 comprise firmware cards, which preferably have the same software version running therein across all ONU's 118 so as to optimize operation of network 100.

ONU's 118 are connected through fiber 120 to a multiplexor referred to as a host digital terminal ("HDT") 122. At HDT 122, signals from multiple ONU's 118 are multiplexed and routed to an Ethernet switch for communication over 100BaseF fiber link 124. HDT 122 comprises a plurality of optical channel shelves ("OCS") 126, each of which has slots therein for receiving a plurality of firmware cards for communicating with ONU's 118. For optimal operation of network 100, the version of software running on each firmware card in HDT 122 for communicating with ONU's 118 is the same. Each shelf 126 further comprises a slot for receiving a firmware card for communicating with the Ethernet switch. The version of software running on each of the firmware cards for communicating with Ethernet switches is preferably the same across all HDT's in network 100.

Fiber connection 124 to CO 128 delivers a 100BaseT data signal from HDT 122 to an Ethernet switch at CO 128. The Ethernet switch multiplexes the 100BaseT inputs from a plurality of HDT's 122 into a single 100BaseT output and terminates it on an Ethernet port of the switch. Subscriber communication to this point in the network uses point-to-point over Ethernet ("PPPoE"), which may be established, for example, using Routerware client software for PCs with Windows 95/98/NT. From the CO Ethernet switch, there is one permanent virtual circuit ("PVC") per NSP 112 and the communication is point-to-point protocol ("PPP") over asynchronous transfer mode ("ATM") ("PPPoA"). Subscriber sessions are established and authenticated with NSP's 112 and ride over the L2TP tunnel within the ATM PVC. The CO Ethernet switch routes all PC data traffic from customers destined for a particular NSP over this tunnel/PVC to the NSP. Thousands of customer PPP sessions can be established over the PVC using L2TP tunneling.

Figure 2:
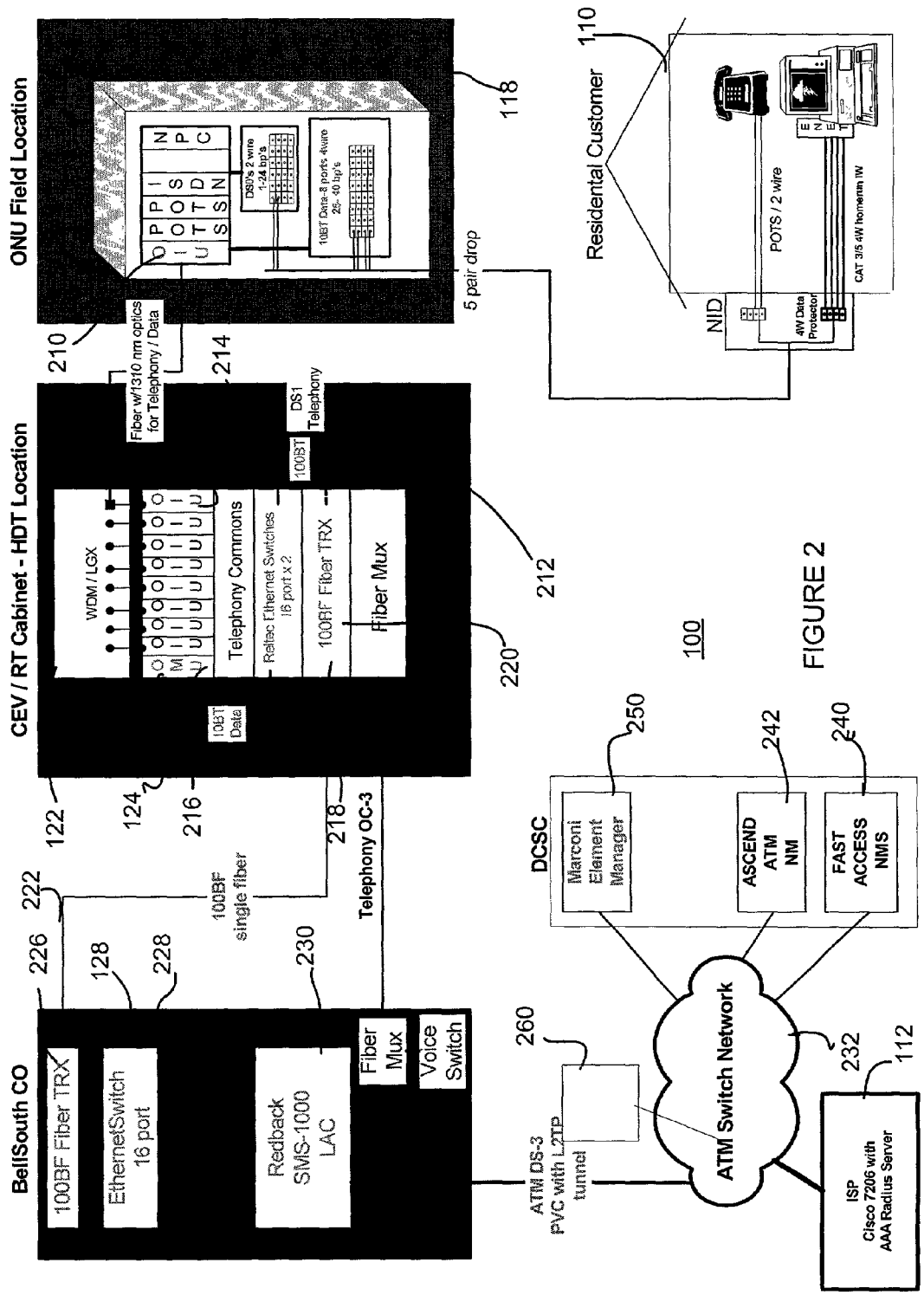
FIG. 2 is a more detailed diagram of an optical fiber network.

FIG. 2 provides a more detailed view of network 100. As shown, subscriber location 110 is connected to ONU 118, which may be, for example, an ONU manufactured by RELTEC Corporation. ONU 118 comprises an optical interface unit (OIU) firmware card 210. The OIU card can accommodate a plurality of subscriber connections.

ONU 118 is connected via a fiber connection to HDT 122, which may be manufactured, for example, by RELTEC Corporation, and which is comprised in remote terminal ("RT") 212. HDT 122 comprises OCS shelves 124, each of which accepts a plurality of firmware cards for terminating signals from ONU's. Specifically, each shelf 124 comprises a plurality of OIU firmware cards 214 wherein each OIU firmware card 214 operates as the termination point for a corresponding OIU firmware card 210 located at an ONU. Each shelf 124 further comprises an optical multiplexing unit ("OMU") firmware card 216, which operates to multiplex the signals from the OIU cards 214, and deliver a 10BaseT output to Ethernet switch 218. Ethernet switch 218 is connected via a 100BaseF transceiver 220 and fiber link 222 to CO 128.

Data is received over data link 222 at CO 128 via 100BaseF fiber transceiver 226 and Ethernet switch 228. Ethernet to ATM switch 230, which may be, for example, a Redback SMS-1000 switch, provides connectivity from CO 128 to ATM network 232. Connectivity is provided through ATM network 232 to ISP or NSP 112.

Network management systems ("NMS's") 240 and 242 control the configuration of network elements for forming a PVC through the IFITL and ATM network to ISP's 112. NMS's 240 and 242 determine which network elements need to be configured in order to create the PVC and route requests to one or more element management systems (EMS's) to implement the configurations. EMS 250 provides for the day-to-day management of ONU's 118 and HDT's 122. For example, EMS 250 controls the provisioning, monitoring and maintenance of the IFITL network. In exemplary network 100, EMS 250 may be, for example, a DISC*S Fiberstar device manufactured by Marconi Communications.

Network 100 also comprises software distribution system (SDS) 260. SDS 260 operates to distribute software upgrades to firmware cards located in HDT's 122 and ONU's 118 as described below in connection with FIG. 4. More specifically, SDS 260 operates to distribute software to OMU 216 and OIU 214 firmware cards comprised in HDT's 122 and OIU firmware cards 210 located on ONU's 118. SDS 260 may be comprised in a computing system such as is described in connection with FIG. 3. Those skilled in the art will recognize, however, that the functionality described herein as corresponding to SDS 260 might be integrated in EMS 250.

OMU firmware cards 216 and OIU firmware cards 214 and 210 provide for communication between ONU 210 and HDT 122. In order for communication to be efficient and to minimize broadcast inconsistencies in network 100, the software comprised in OIU cards 210 should be compatible with the software on OIU cards 214. More preferably, the software versions on all OIU cards 210 should be the same across ONU's 118, and the software versions on all OIU cards 214 should be the same across HDT's 122. Likewise, software on OMU cards 216 should be compatible with the software on OIU cards 214, and preferably, the version of software on all OMU cards 216 should be the same on all HDT's 122 across the network. SDS 260 is operable to identify software on OMU's 216, OIU's 214, and OIU's 210 that is not the desired or prescribed version and to update the software as necessary.

Figure 3:
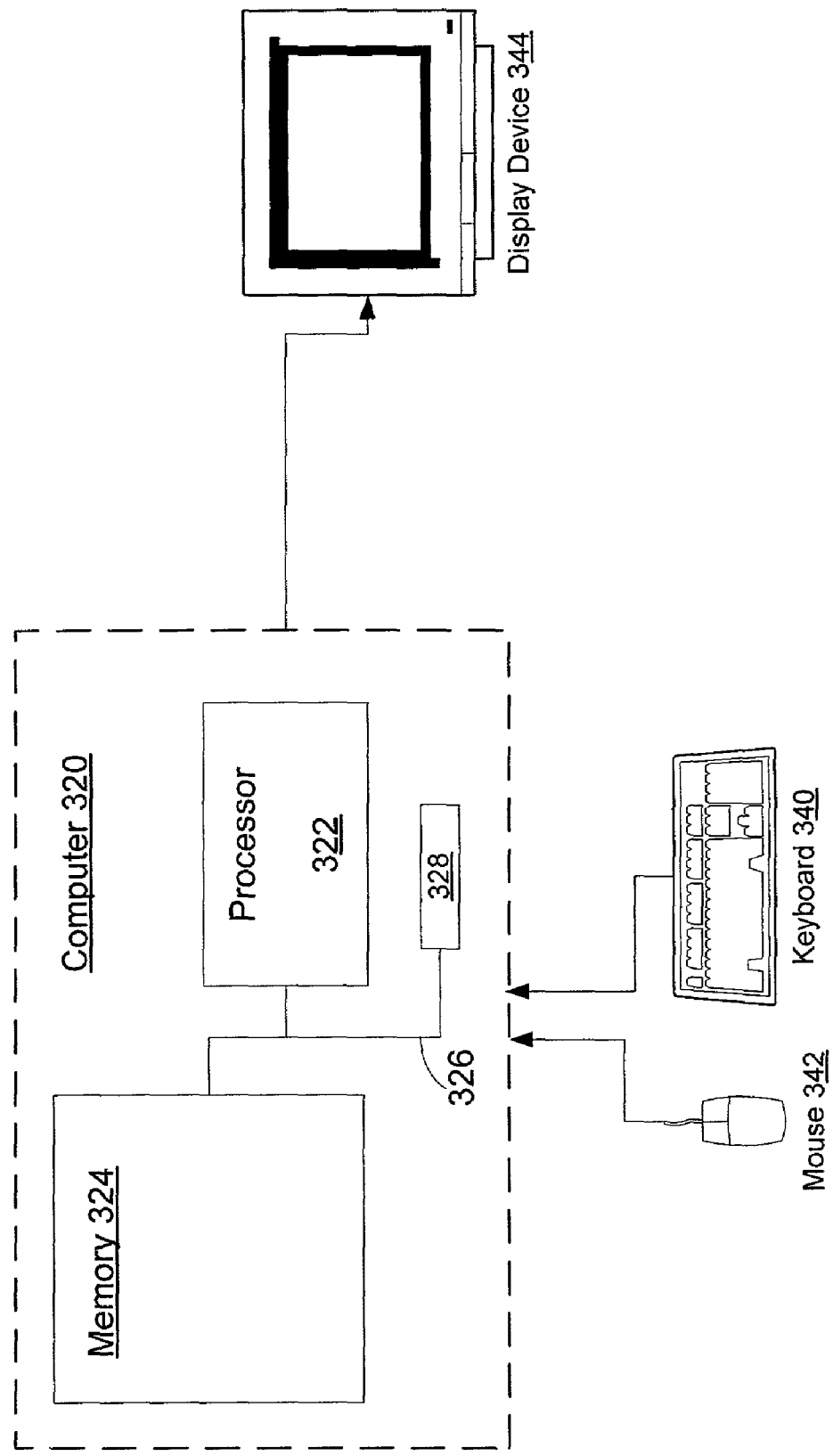
FIG. 3 is a block diagram of a computing system suitable for use in an embodiment of the present invention.

SDS 260 comprises a generic computing system such as is depicted in FIG. 3. FIG. 3 is a block diagram of a generic computing system suitable for use in a system in accordance with the present invention. As shown, computing device 320 includes processing unit 322, system memory 324, and system bus 326 that couples various system components including system memory 324 to the processing unit 322. The system memory 324 might include read-only memory (ROM) and random access memory (RAM). The system might further include hard-drive 328, which provides storage for computer readable instructions, data structures, program modules and other data. A user may enter commands and information into the computer 320 through input devices such as a keyboard 340 and pointing device 342. A monitor 344 or other type of display device is also connected to the system for output. Processor 322 can be programmed with instructions to interact with other computing systems so as to perform the algorithms described below with reference to FIG. 4. The instructions may be stored in memory 324 and/or hard drive 328. Processor 322 may be loaded with any one of several computer operating systems such as Windows NT, Windows 2000, or Linux.

Generally, SDS 260 operates by checking each OMU card 216 and OIU card 214 on an HDT 122 to determine whether a software/firmware update is necessary. If the software version on a card is not the desired version and therefore requires updating, SDS 260 performs the update. Thereafter, SDS 260 connects to each ONU 118 that communicates with the particular HDT 122, and checks the software/firmware of the OIU card 210 located on each ONU 118. If the software on an OIU card 210 is not the desired version and requires updating, SDS 260 performs the update.

Figure 4:
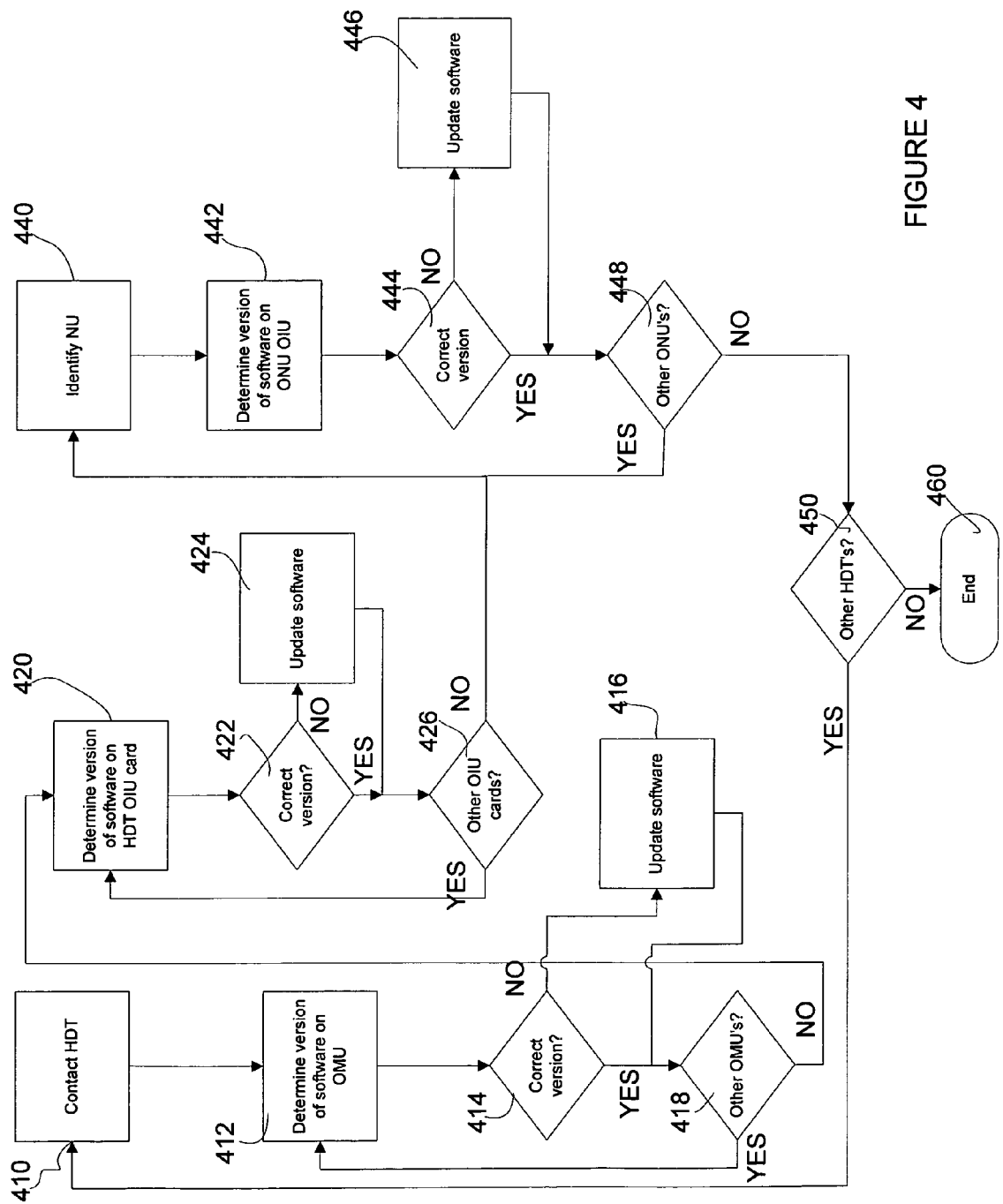
FIG. 4 is a flow diagram of a process for automated software distribution for a fiber optic network.

FIG. 4 provides a flowchart of a process for checking and distributing software in accordance with the invention. As shown, at step 410, SDS 260 contacts one of HDT's 122 in network 100. At step 412, SDS 260 identifies the software version on an OMU firmware card 216 on the selected HDT 122. If at step 414, the software is not the desired version, at step 416, SDS 260 downloads the appropriate software. However, if at step 414, the OMU card 216 has the correct software version, at step 418, SDS 260 determines if there are other OMU firmware cards 216 on HDT 122. If so, SDS 360 repeats the process beginning with step 412. If at step 418 no other OMU cards 216 are located in the HDT 122, SDS 260 proceeds to check the software versions on OIU cards 214.

At step 420, SDS 260 identifies the software version on one of the OIU firmware cards 214 on the selected HDT 122. If at step 422, the software is not the correct version, at step 424, SDS 260 downloads the appropriate software. However, if at step 422, the OIU card 214 has the correct software version, at step 426, SDS 260 determines if there are other OIU firmware cards 214 on HDT 122. If so, SDS 260 repeats the process beginning with step 420. If at step 426 no other OIU cards 214 are located in the particular HDT 122, SDS 260 proceeds to check the software versions on OIU cards 210 of the connected ONU's 118.

As shown, at step 440, SDS 260 identifies an ONU 118 connected to the HDT 122 analyzed in steps 410 through 426 above. At step 442, SDS 260 determines the software version on an OIU card 210 located in ONU 118. If at step 444, the software is not the desired version, at step 446, SDS 260 updates the software. At step 448, SDS 260 determines if there are other ONU's 118 that communicate with the previously analyzed HDT 122. If so, SDS 260 repeats the process beginning with step 440.

If at step 448, there are no further ONU's 118 connected to the particular HDT 122, at step 450, SDS 260 determines whether there are other HDT's 122 in network 100 that need to be checked for software updates. If so, SDS 260 begins the process again at step 410. If not, the process ends at step 460.

Thus, systems and methods for provisioning software updates to network elements comprised in a fiber optic network have been disclosed. These novel systems and methods allow administrators to automatically identify locations in the fiber optic network that might detrimentally impact the performance of the network and automatically update software as necessary. The systems and methods in accordance with the invention thereby greatly simplify software provisioning and troubleshooting in the fiber optic network.

Those skilled in the art understand that computer readable instructions for implementing the above-described processes, such as those described with reference to FIG. 4, can be generated and stored on one of a plurality of computer readable media such as a magnetic disk or CD-ROM. Further, a computer such as that described with reference to FIG. 3 may be arranged with other similarly equipped computers in a network, and each computer may be loaded with computer readable instructions for performing the above-described processes. Specifically, referring to FIG. 3, microprocessor 322 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described in connection with an IFITL network, the systems and methods may be employed in other network types such as for example, fiber to the home (FTTH) and similar fiber optic networks. Accordingly, reference should be made to the appended claims as indicating the scope of the invention.

What is claimed is:

1. In a fiber optic network including at least one host digital terminal (HDT) that includes at least one optical multiplexing unit (OMU) and at least one optical interface unit (OIU), and including at least one optical network unit (ONU) that includes at least one further OIU, one or more computer readable storage media having computer executable instructions stored thereon for performing a method for automated distribution of software loaded into the OMU, the OIU, and the further OIU, the method comprising:

(a) identifying a version of first software installed on the OMU, the first software being for multiplexing signals from the at least one OIU of the HDT and for communicating with a switch;

(b) determining whether the version of the first software is a first prescribed software version;

(c) only if the version of the first software is not the prescribed software version, downloading the first prescribed software version to the OMU and updating the first software to be the first prescribed software version;

(d) identifying a version of second software installed on the OIU, the second software being for terminating signals from the at least one ONU and for communicating with the OMU;

(e) determining whether the version of the second is a software second prescribed software version; and (f) only if the version of the second software is not the second prescribed software version, downloading the second prescribed software version to the OIU and updating the second software to be the second prescribed software version;

(g) identifying a version of third software installed on the further OIU, the third software being for multiplexing a plurality of subscriber connections and for communicating with an OIU of the HDT;

(h) determining whether the version of the third software is a third prescribed software version; and (i) only if the version of the third software is not the third prescribed software version, downloading the third prescribed software version to the further OIU and updating the third software to be the third prescribed software version.

2. The computer readable media of claim 1, further comprising instructions for contacting the HDT at least to identify the version of the first software and the version of the second software.

3. The computer readable media of claim 1, further comprising instructions for determining whether the HDT includes at least a further OMU.

4. The computer readable media of claim 3, further comprising instructions for:
- identifying a version of software installed on the further OMU;
- determining whether the version of the software installed on the further OMU is a prescribed software version; and
- if the version of the software installed on the further OMU is not the prescribed software version, updating the software installed on the further OMU to be the prescribed software version.

5. The computer readable media of claim 1, further comprising instructions for determining whether the HDT includes at least a further OIU.

6. A method for automated distribution of software in a fiber optic network including at least one host digital terminal (HDT) that includes at least one optical multiplexing unit (OMU) and at least one optical interface unit (OIU), and including at least one optical network unit (ONU) that includes at least one further OIU, the method comprising:
- (a) identifying a version of first software installed on the OMU, the first software being for multiplexing signals from the at least one OIU of the HDT and for communicating with a switch;
- (b) identifying a version of second software installed in the further OIU connected to the OMU over a fiber optic connection, the second software being for multiplexing a plurality of subscriber connections and for communicating with an OIU of the HDT;
- (c) determining whether there is at least a further ONU connected to the OMU over a fiber optic connection;
- if so, then identifying a version of software installed in at least one OIU included in the further ONU, the version of software installed in the at least one OIU included in the further ONU being for multiplexing a plurality of subscriber connections and for communicating with an OIU of the HDT; and
- (d) determining if the second software is compatible with the first software; and
- (e) only if the first software is not compatible with the second software, then downloading an updated version of the first software to the OMU and updating the first software; and
- (f) determining whether the fiber optic network includes at least a further OMU and, if so, repeating the method for the further OMU.

7. The method of claim 6, wherein determining if the second software is compatible with the first software comprises determining if a version of the second software is compatible with a version of the first software.

8. The method of claim 6, wherein identifying a version of the first software comprises determining a version of software installed on a firmware card in the OMU.

9. The method of claim 8, wherein determining the version of software on the firmware card in the OMU comprises determining the version of software on at least one of an optical interface unit card and an optical multiplexing unit card.

10. The method of claim 6, wherein identifying the software comprised in the OIU comprises determining a version of software on a firmware card located on the OIU.

11. The method of claim 10, wherein determining the version of software on the firmware card located on the network unit comprises determining the version of software on an optical interface unit card.

12. A computer readable medium having computer executable instructions for performing the method of claim 6.

13. A system for automatically distributing software in a fiber optic network including at least one host digital terminal (HDT) that includes at least one optical multiplexing unit (OMU) and at least one optical interface unit (OIU), and including at least one optical network unit (ONU) that includes at least one further OIU, the system comprising:
- a processor for executing computer executable instructions; and
- memory for storing computer executable instructions, wherein
- said memory has stored therein computer executable instructions for performing the following steps:
  - (a) initiating a single contact with the OMU;
  - (b) identifying software comprised on ones of a plurality of firmware cards located in the OMU, the software being for multiplexing signals from the at least one OIU of the HDT and for communicating with a switch;
  - (c) determining whether the software comprised on the firmware cards located in the OMU is a prescribed software version;
  - (d) only if the software comprised on one of said plurality of firmware cards located in the OMU is not the prescribed software version, downloading the prescribed software version to the OMU and updating the software;
  - (e) identifying software comprised on a firmware card located in the ONU, wherein the ONU is connected to the OMU over a fiber optic connection, the software being for multiplexing a plurality of subscriber connections and for communicating with an OIU of the HDT;
  - (f) determining whether the software comprised on the firmware card located in the ONU is a prescribed software version; and
  - (g) only if the software comprised in the firmware card located in the ONU is not the prescribed software version, downloading the prescribed software version to the ONU and updating the software;
  - (h) determining whether there is at least a further ONU connected to the OMU over a fiber optic connection;
    - if so, then performing steps (e) through (g) for the further ONU; and
    - if not, then determining whether there is at least another multiplexor OMU in the fiber optic network and, if so, repeating steps (a) through (h) for the other OMU.

* * * * *